United States Patent
Schilling et al.

(10) Patent No.: US 7,109,819 B2
(45) Date of Patent: Sep. 19, 2006

(54) DEVICE FOR WIDEBAND ELECTRICAL CONNECTION OF TWO UNITS THAT ARE MOVABLE RELATIVE TO EACH OTHER

(75) Inventors: Harry Schilling, Eichstätt (DE); Georg Lohr, Eichenau (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 11/007,807

(22) Filed: Dec. 8, 2004

(65) Prior Publication Data

US 2005/0168299 A1 Aug. 4, 2005

Related U.S. Application Data

(63) Continuation of application No. PCT/DE03/01645, filed on May 21, 2003.

(30) Foreign Application Priority Data

Jun. 10, 2002 (DE) ................. 102 25 803

(51) Int. Cl.
*H01P 1/06* (2006.01)
*H01P 5/12* (2006.01)
(52) U.S. Cl. ............... 333/24 R; 333/111; 333/32
(58) Field of Classification Search ............ 333/24 R, 333/109, 111, 32
See application file for complete search history.

(56) References Cited

U.S. PATENT DOCUMENTS

| 3,757,028 A * | 9/1973 | Schlessel ............... 174/33 |
|---|---|---|
| 3,944,912 A | 3/1976 | Angel et al. |
| 4,516,097 A * | 5/1985 | Munson et al. ........... 333/261 |
| 4,916,415 A * | 4/1990 | Moulton et al. ........... 333/26 |
| 5,140,696 A * | 8/1992 | Fox ...................... 455/41.1 |
| 5,287,117 A | 2/1994 | Posluszny |
| 5,808,518 A * | 9/1998 | McKinzie et al. ........ 333/26 |
| 5,892,411 A * | 4/1999 | Schwan et al. .......... 333/24 R |
| 6,433,272 B1 * | 8/2002 | Buhler et al. ............ 174/27 |
| 6,825,737 B1 * | 11/2004 | Lohr ...................... 333/24 R |

FOREIGN PATENT DOCUMENTS

| DE | 196 46 682 | 6/1998 |
|---|---|---|
| DE | 197 00 110 | 7/1998 |
| WO | 01/41315 | 6/2001 |

OTHER PUBLICATIONS

Patent Abstracts of Japan, publication No. 2000195250, published Jul. 14, 2000.
International Search Report, PCT/DE03/01645, mailed Oct. 1, 2003.

* cited by examiner

*Primary Examiner*—Robert Pascal
*Assistant Examiner*—Kimberly E. Glenn
(74) *Attorney, Agent, or Firm*—Kevin L. Daffer; Daffer McDaniel, LLP

(57) ABSTRACT

A device for signal transmission between units which are movable relative to each other along predetermined paths comprises at least one transmitter associated with a first unit for generating electrical signals, at least one conductor arrangement associated with the first unit and connected to the transmitter for carrying the electrical signals along a course of the conductor arrangement extending substantially along a path of the movement, and at least one receiver associated with a second unit for decoupling electrical signals from the conductor arrangement. Means for balancing the electrical signals are provided along the course of the conductor arrangement for reducing interference radiation or susceptibility to interference.

19 Claims, 3 Drawing Sheets

DEVICE FOR WIDEBAND ELECTRICAL CONNECTION OF TWO UNITS THAT ARE MOVABLE RELATIVE TO EACH OTHER

CROSS REFERENCE TO RELATED APPLICATIONS

This application is a continuation of pending International Application No. PCT/DE03/01645 filed May 21, 2003 which designates the United States and claims priority from pending German Application No. 102 25 803.1 filed Jun. 10, 2002.

BACKGROUND OF THE INVENTION

1. Field of the Invention

The invention relates to a device for transmitting electrical signals or energy between a plurality of units that are movable relative to each other.

For the sake of clarity of presentation, no distinction will be made in this document between a transmission between units that are movable relative to each other, and between one fixed unit and units movable relative thereto, because this is only a matter of positional relationship and does not affect the manner of operation of the invention. Similarly, no distinction will be made between a transmission of signals and of energy, because the mechanisms of operation are the same in both cases.

2. Description of the Prior Art

In the case of linearly movable units such as crane and conveyor systems, and also computer tomographs, it is necessary to transmit electrical signals or energy between units that are movable relative to each other. A device suitable for this is described in the German laid open Patent Application DE 44 12 958 A1. Here a signal to be transmitted is fed into a strip conductor line of the first unit that is disposed along a path of movement of the units that are movable relative to each other. The signal is tapped off from the second unit by means of a capacitive or inductive coupling. An improved device for transmission, as described for example in WO 98/29919, is based on a specific conductor structure that also possesses filter characteristics. Extremely wideband transmission systems operating in a range from a few MHz up to Ghz may be obtained with structures of this kind. In the following expositions, the term conductor structures relates to all conceivable configurations of conductor structures which are suitable for carrying electrical signals. The signals are decoupled in the near field of the conductor structure. In an ideal case, a decoupling of signals should occur exclusively within range of the second unit. Further emission of signals in other ranges of the conductor structure is not desirable, as distinct from the case of known leakage lines, because the wide band signals can lead to interference in other instrument parts or instruments.

The principles of designing and dimensioning leakage lines, such as described in the U.S. Pat. No. 5,936,203, cannot be applied to conductor structures of this kind. Leakage lines are specifically designed to radiate a certain portion of the carried high frequency energy outwards along the entire length. This is exactly what is to be avoided here.

Technically similar to a non-contacting decoupling of signals is also a contacting decoupling of signals. However, a non-contacting decoupling is usually preferred, because it is more reliable and free from needing maintenance.

The conductor structures described here may be optionally designed to be contacting or also non-contacting. In this case, of course, adaptations are possible according to the purpose of the transmission. Thus, a conductor structure for contacting transmission may have a particularly well conducting surface, for example with a silver coating. Contrary to this, a conductor structure for non-contacting transmission may be provided with a lacquer coat on the surface as corrosion protection. However, in these cases the basic principles for designing the conductor structures are identical. A special design of a contacting transmission means is described in the U.S. Pat. No. 5,208,581. Here an unbalanced conductor system is also described. Although here the configuration is symmetrical, the conductor system is fed with an unbalanced signal. The signal flow from the transmitter to the receiver is effected via a central conductor, and is returned partly via one or both outer conductors, or even via the computer tomograph system itself. Here the instrument itself is a reference surface. Here the configuration of the reference surface is not designed to be unequivocally symmetrical. Because of the unbalanced signals that have a not unequivocally defined signal path, and the undefined reference surface, this system radiates high HF power. Already with data rates of 50 Mbaud, current EMC Standards can no longer be satisfied without additional costly screening.

The conductor arrangements used here for transmission are usually constructed to be strip conductor lines or conductor structures by means of double-sided printed circuit boards. Glass-fiber reinforced plastics usually serve as a support and a dielectric. This support is provided on one side with a continuous conductor surface as electrical reference surface or mass, and on the other side with a strip-shaped conductor or the conductor structure.

One of the most difficult technical problems with transmission systems of this kind is the achievement of a high resistance to interference and also a low emission of radiation emission. Now, in order to achieve a signal transmission with particularly low interference, for example two parallel conductors or conductor structures are symmetrically supplied with a differential signal. This makes the far field approximately equal to zero, at least for conductor spacings that are smaller than the wavelength. Thus, only extremely low energy is radiated. In the opposite case, in the event of undesired coupling-in of electromagnetic waves from the outside, the same signal is produced in both conductors. This may now be filtered off by a receiving circuit having a high common mode rejection. Symmetry of the entire arrangement is essential for a high resistance to interference.

Normally, the signal level of the transmitter cannot be increased arbitrarily in order to increase the resistance to interference. Despite high symmetry, low radiation will always occur. The radiation decreases with higher symmetry, and the signal levels can be increased further.

At large bandwidths or data rates within the range from a few 100 MHz up to several GHz, attenuations or distortions of the signals, which are not negligible, will occur. Thus, attenuations of the order of magnitude of 10 dB per meter were measured for usual conductor materials and a frequency of 1 GHz. For great lengths this leads to unacceptable attenuations. Furthermore, there is an increased risk of non-symmetries, because the dielectric cannot be fabricated to be as symmetrical or homogeneous as desired.

A solution that avoids these problems from the outset is set out in the U.S. Pat. No. 5,287,117. With this, the conductor arrangement is replaced by a plurality of small antenna segments. These may be manufactured with high quality materials on printed circuit boards of small area. Feeding via long distances can be effected with high quality coaxial cables having highly screening characteristics and low attenuation. However, here too, owing to the large number of antenna segments, large requirements of material and, in particular, a large outlay of assembly work result, which leads to high fabrication costs.

BRIEF SUMMARY OF THE INVENTION

The problem arises of designing a wideband low cost device for signal transmission that is based on a conductor arrangement having conductors or conductor structures, and exhibits high resistance to interference, and emits low interference radiation.

In accordance with the invention the problem is solved with a device for signal transmission between at least one first unit that is movable relative to at least one second unit along a predetermined path of movement, comprising: at least one transmitter associated with the first unit, for generating electrical signals; at least one conductor arrangement associated with the first unit and connected to the transmitter, for carrying at least one of the generated electrical signals along a course of the conductor arrangement extending substantially along the path of movement; and at least one receiver associated with the second unit for decoupling electrical signals from the conductor arrangement; wherein means for balancing electrical signals are provided along the course of the conductor arrangement.

DETAILED DESCRIPTION OF THE INVENTION

A device for signal transmission according to the invention comprises at least one transmitter for generating the electrical signals to be transmitted and feeding them into a conductor arrangement. At least one of these conductor arrangements is disposed along the path of the movement and guides the signals fed-in by the transmitter. At least one receiver that is movable relative to the transmitter and conductor arrangement serves for decoupling the signals from the conductor arrangement. According to the case of use, a transmitter may also feed a plurality of conductor arrangements. Similarly, a conductor arrangement may be fed by a plurality of transmitters. Furthermore, it is possible for a desired number of receivers to be used on a conductor arrangement for decoupling signals.

According to the invention, means for balancing electrical signals are provided along the course of the conductor arrangement. These balancing means increase the electrical symmetry of signals carried in the conductor arrangement. If the symmetry of electrical signals passing through the conductor arrangement is reduced by non-symmetries of the conductor arrangement, then it may be increased by balancing means in accordance with the invention. With this increased symmetry of the signals, an increased resistance to interference, or a reduced radiation of interference, may be achieved in turn. Balancing means in accordance with the invention allow symmetrical signals or signal components on the conductor arrangement to pass, and attenuate non-symmetrical signals or signal components.

An increase of the resistance to interference results from external interfering signals that are preferably coupled into the conductor arrangement as unbalanced signals (common mode signals) being attenuated by the balancing means.

A reduction of emitted radiation results from balanced signals (push-pull signals) that give rise to only small radiation being preferably carried in the conductor structure.

A conductor arrangement comprises at least one conductor structure in which electrical signals may be carried. A conductor structure of this kind comprises one or a plurality of conductors of a preferably well conducting material. Preferably a conductor arrangement comprises a conductor structure of two symmetrically disposed conductors that are supplied with balanced signals. Alternatively, conductor structures of non-symmetrical design, or having a plurality of conductors, are also usable, but then only poorer values of interference resistance or emitted radiation can be obtained, compared with those of balanced two-conductor systems.

In a particularly advantageous embodiment of the invention, additional means for balancing electrical signals are provided between at least one transmitter and the conductor arrangement. With additional balancing means of this kind, an already well balanced electrical signal can be fed into the conductor arrangement. Thereby less demands are made on the balancing means along the course of the conductor arrangement, and a higher symmetry of the signal can be obtained.

In another advantageous embodiment of the invention, additional means for balancing electrical signals are provided between the conductor arrangement and at least one receiver. With additional balancing means of this kind between the conductor arrangement and at least one receiver, the level of unbalanced interference (common mode signals) can be reduced. Thereby the resistance of the receiver to interference is increased.

Another advantageous embodiment of the invention provides for a symmetrical design of the conductor arrangement. Basically, a design of the transmission means in accordance with the invention is also possible with a non-symmetrical conductor arrangement in which means for balancing electrical signals are provided at preferably small spacings. Hereby a balanced signal may be achieved even along large distances. However, it is of substantially greater advantageous to choose a symmetrical configuration of the conductor arrangement from the start. With this, the demands made on the balancing means become substantially less. Similarly, with this a substantially more balanced signal may be obtained.

In another advantageous embodiment of the invention, a conductor arrangement comprises at least one electrically conducting reference surface assigned to each conductor structure. At least one dielectric for insulating the conductor structure and the reference surface is located between the conductor structure and the reference surface. A dielectric of this kind optionally has high homogeneity or high symmetry relative to the electrical center of the longitudinal axis of the conductor structure. The concept of symmetry here relates to symmetry of the electric field. Starting out from the electrical center of the conductor structure, the lines of the electric field should extend symmetrically. This may be achieved, for example, with an arrangement having mirror symmetry. However, other achievements also may be conceived, as for example in the case of a layered dielectric having conductors parallel to the reference surface. Basically, here the order of the layers of the dielectric may be different for the layers, when the overall dielectric constants on both sides are equal, and also the surfaces are of equal size.

The symmetry of the electric field is referred to an equipotential surface having a potential that corresponds to the mean potential between the active conductors, i.e. those used for carrying signals. The conductor structure is mainly open to free space on one side. The coupling-on of receivers is made by starting out from this side. The opposite side, and optionally also its boundary, are closed-off by faces which are as symmetrical as possible and have a conducting surface. With this, on the one hand a defined impedance of the conductor system may be attained, and on the other hand a defined symmetrical boundary may be achieved. If no defined reference surface were to be present here, then at least one part of the instrument in which the device is mounted would serve as an electrical reference. The necessary symmetry would certainly not be achieved along the entire length of the conductor structure, because various components or groups of components of the instrument would not be disposed as symmetrically as desired.

In another embodiment of the invention, the transmitter or balancing elements are mounted in the immediate vicinity of the conductor arrangement. Thereby additional interference may be minimized. Similarly, with this any mismatching may be minimized. Furthermore, a particularly space-saving structure may be achieved thereby.

Another embodiment of the invention provides for the balancing means to be incorporated into the conductor arrangement. With this incorporation, a simpler structure is possible at lower manufacturing cost.

In a particularly advantageous embodiment, the incorporation is effected by means of multi-layer printed circuit technology. Thus, elements of the conductor arrangement and also elements for balancing may be mounted on different conductor layers.

In another embodiment of the invention, additional elements such as, for example, ferromagnetic elements, are mounted directly onto the conductor arrangement. Optionally these may be single discrete ferromagnetic elements that are mounted onto the conductor arrangement at predetermined spacings. Similarly, this may be also a structure of ferromagnetic material mounted on longer sections of the conductor arrangement, or on the entire length thereof.

In another advantageous embodiment of the invention, a line of two conductors disposed in parallel is provided to balance electrical signals. With the conductors disposed in parallel, a coupling of electric and magnetic fields results. Thereby a balancing action is obtained. By means of a suitable design that takes into account the configuration and the dielectric, a matching of the impedance of the conductor arrangement may be achieved. Thus, the balancing means causes no additional reflections and interference along the conductor arrangement.

In another embodiment of the invention, at least one transformer, preferably of balun or Guanella type, is provided for balancing. Balancing elements of this kind are disclosed, for example in Meinke, Gundlach "Taschenbuch der Hochfrequenz" (Handbook of High-Frequency Technology), published by Springer-Verlag, Berlin, 1968, in particular on page 398.

Of particular advantage is a design of balancing elements in the form of a flexible printed circuit board having two conductors that are disposed in parallel to each other and are wound to form a coil. For this, the flexible printed circuit board is wound in the same way as a line to form a coil.

Furthermore, a design of the coils according to planar printed-circuit board techniques is of particular advantage. With this, particularly space-saving components may be obtained, especially by use of multi-layer techniques. Advantageously, a spiral-shaped conductor configuration of at least two parallel conductor paths on different layers of the printed circuit board is chosen.

In another advantageous embodiment, at least one coil has a core of ferromagnetic material.

Another embodiment of the invention provides at least one transmitter having a balanced output stage for generating balanced output signals. With this, balancing is effected preferably with active means, for example differential amplifiers.

BRIEF DESCRIPTION OF THE DRAWINGS

In the following the invention will be described by way of example, without limiting the general inventive concept, on embodiments with reference to the drawings.

Figure 1:
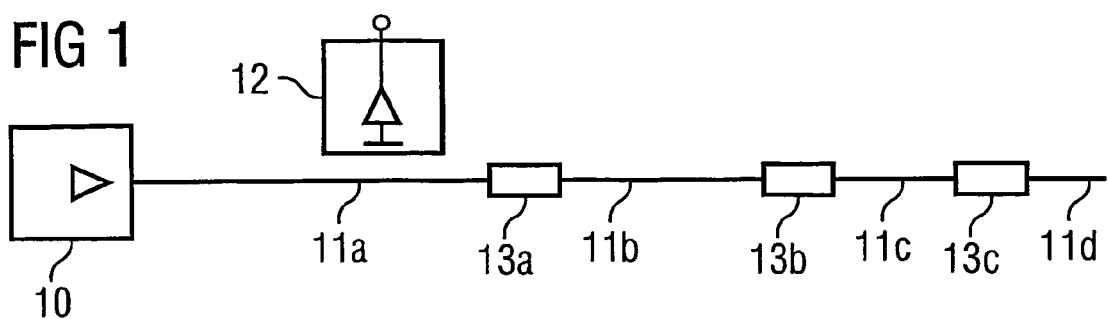
FIG. 1 schematically shows in general form a device according to the invention.

LIST OF REFERENCE NUMERALS 1 conductor structure
1a first conductor
1b second conductor
2 reference surface
3 dielectric
6 support
10 transmitter
11 conductor arrangement
12 receiver
13 balancing means
14 ferrite core, ferrite material
15 printed circuit board
16 line

DETAILED DESCRIPTION OF THE DRAWINGS

In FIG. 1 a device according to the invention is illustrated as an example. A transmitter 10 feeds electrical signals into the conductor arrangement 11a, 11b, 11c, 11d. The receiver 12 is movably disposed opposite to the conductor arrangement and the transmitter 10 connected thereto. Balancing means 13a, 13b, 13c are provided between the individual sections of the conductor arrangement. These balance a signal carried along the conductor arrangement.

A relative movement occurs along given paths. Paths of this kind may be linear or also circular. The conductor arrangement 11a, 11b, 11c, 11d is disposed along at least one of these paths of movement, so that at every position of the movement from which signals are to be transmitted, there is only a short distance between the conductor arrangement 11a, 11b, 11c, 11d and the receiver 12. Typically, these distances range from 0.1 mm to about 10 mm. A direct contact at a distance of 0 is possible. This is a case of galvanic transmission. In order to maintain a long lifetime of the contact system here, it is necessary to design the surfaces specially. In a normal case, however, a transmission which is non-contacting and therewith attended by low wear is desired. Distances greater than about 10 mm are not excluded, but are undesirable in most cases, because the radiation of the entire conductor arrangement should be so low that no interference or affecting of other instrument parts or instruments occurs. Therefore the transmission system is designed specifically so that the electromagnetic far field of the conductor arrangement is as small as possible, and zero in the ideal case.

Figure 2:
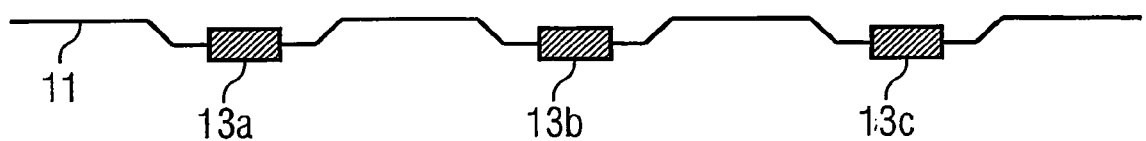
FIG. 2 shows a conductor arrangement with balancing means of ferrite material.

FIG. 2 shows in exemplary manner a particularly simple embodiment of a conductor arrangement 11. In this, balancing means 13a, 13b, 13c are disposed at predetermined spacings. Advantageously, these are ferromagnetic components, such as ferrite cores, for example. In order to enable a movement of the receiver 12 here, the balancing means have been lowered in the immediate vicinity of the conductor arrangement.

Figure 3:
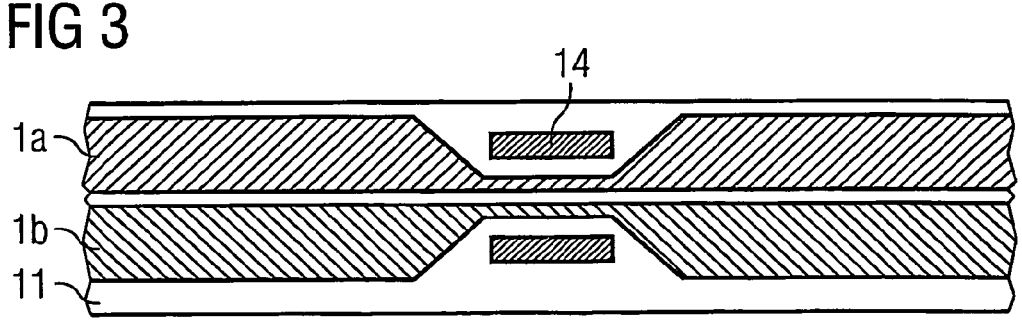
FIG. 3 shows a plan view of a cut-out portion of a conductor arrangement of FIG. 2.

FIG. 3 shows a plan view of a cut-out portion of an arrangement having ferrite cores. The conductor arrangement 11 has, for example, a first conductor 1a and also a second conductor 1b. A ferrite core 14 (here illustrated in sectional view) which encloses the two conductors is provided as a balancing means. This ferrite core could be an annular core or a core having a rectangular cross-section. In order to reduce requirements of space and increase the coupling between the two conductors, the conductors have a smaller cross-section at the position of the ferrite core. Of course, the cross-section may also remain unchanged.

Figure 4:
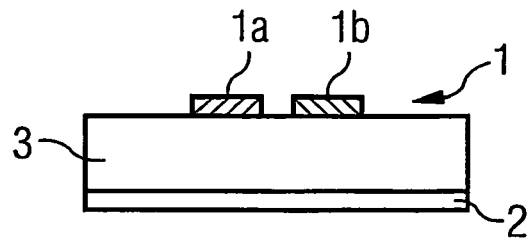
FIG. 4 shows a simple balancing means in the form of a printed circuit board having two parallel conductor paths.

In FIG. 4 a particularly advantageous embodiment of a means for balancing electrical signals is illustrated. A conductor structure 1 consists of a symmetrically disposed pair of conductors, comprising a first conductor 1a and also a second conductor 1b which are separated from a reference surface by a dielectric 3. A conductor arrangement of this kind by itself already has a certain balancing effect; this may be substantially increased, for example by the conductors being wound onto a ferrite core, preferably an annular core. For this, the conductor structure is preferably made to be of small configuration. For example, a total width of 2 millimeters has proved to be satisfactory. An additional layer of ferromagnetic material can be provided below the reference surface 2 in order to improve the balancing action. Similarly, with an arrangement of this kind, a second reference surface, not shown here, may be mounted above the first and second conductor. With this, the conductors are disposed to be completely screened. In this case, a second layer of ferromagnetic material may be also provided above the conductors. Of course, the complete conductor structure may be also enclosed by ferromagnetic material.

Figure 5:
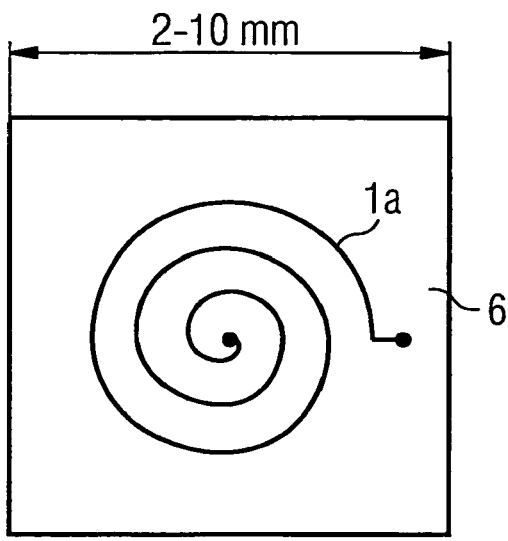
FIG. 5 shows a particularly advantageous balancing means having a spiral-shaped conductor arrangement.

In FIG. 5 another advantageous embodiment of a balancing means is illustrated. In this, an arrangement of a plurality of conductors, preferably two conductors, disposed in parallel on different layers of a support 6, are spirally wound. An optional ferrite core may be used to increase the inductance or balancing action. In the graphical illustration only one first conductor la is visible on the upper layer. Contacting of this arrangement may be effected optionally with wire pins, or also with a printed circuit board disposed perpendicularly to the support. Preferably, the length of the conductor should be dimensioned to be substantially shorter than the smallest wavelength of the signal to be transmitted. Therefore a balancing means of this kind is formed using miniaturization techniques, for example micromechanics, laser cutting, and sputtering, or as a microstructure.

Figure 6:
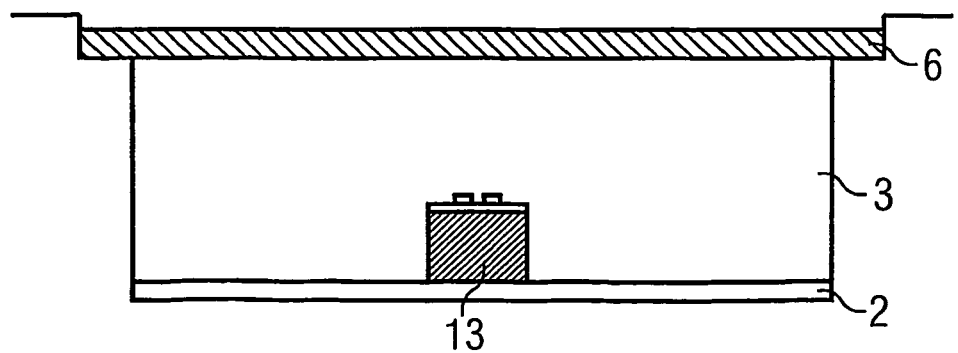
FIG. 6 shows an arrangement of a balancing means with respect to a conductor arrangement.

FIG. 6 shows another advantageous embodiment of the invention. A conductor arrangement is used in which the conductors (not illustrated here) are mounted on a support 6. Usable as the dielectric 3 between the conductors and the reference surface is air, for example, but also any other dielectric, such as, for example, a known plastic material. At least one balancing means 13 is disposed within the dielectric.

Figure 7:
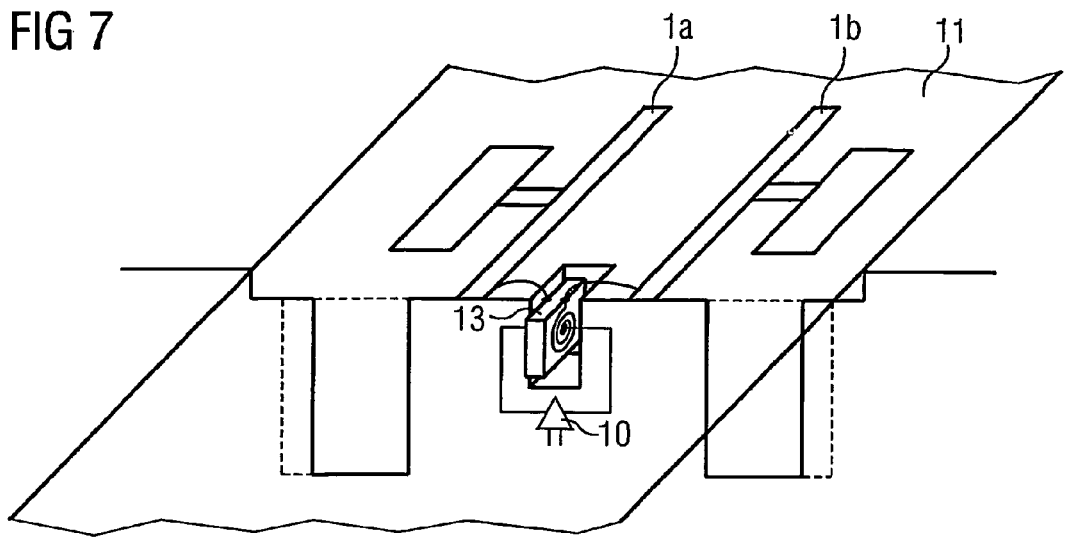
FIG. 7 shows an arrangement of a balancing means between a transmitter and a conductor arrangement.

FIG. 7 shows a perspective illustration of an arrangement in which one balancing means 13 is disposed directly between a transmitter 10 that preferably by itself already supplies a balanced output signal, and the conductor arrangement 11 comprising at least one first conductor 1a and also a second conductor 1b. The two conductors here consist, for example, of a structure having single resonators. Of course, any other conceivable conductor structure, for example as made by strip conductor technique, may be employed. Balancing means of this kind may be employed also along the further course of the conductor arrangement.

Figure 8:
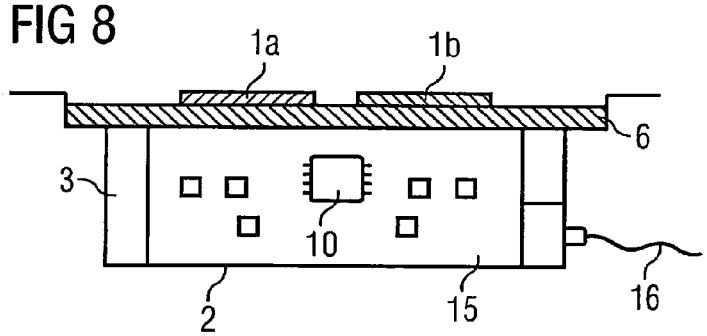
FIG. 8 shows a particularly advantageous arrangement of a transmitter.

In FIG. 8 a particularly advantageous kind of arrangement of a transmitter 10, that is disposed on a printed circuit board 15, is shown. A first conductor 1a and also a second conductor 1b are disposed on a support 6. Furthermore, a reference surface 2 is provided that is electrically conducting. At least one dielectric 3 is provided between the reference surface and the conductors. The printed circuit board 15 is disposed within the space of the dielectric. With this arrangement particularly short and symmetrical conductor paths may be formed. A supply of signals to the transmitter is effected by means of a line 16.

Figure 9:
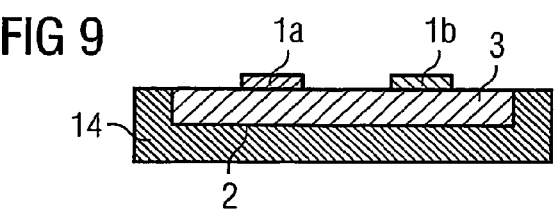
FIG. 9 shows an arrangement of a ferromagnetic material along a conductor arrangement.

In FIG. 9 a particularly expedient arrangement is shown in section, in which the ferrite material is disposed along the conductor structure. Thus, a continuous balancing of the signal results. In this, it is essential for the predominant portion of the magnetic field to be guided around the two conductors, and not to pass through them. Magnetic field guidance of this kind can be achieved by means of the limbs projecting on both sides of the conductor structure. Of course, also a planar surface of ferrite material without projecting limbs may be disposed on the rear side of the conductor structure. However, here the balancing action is smaller. Preferably an electrical reference surface 2 is further provided between the dielectric 3 and the ferrite material 14.

Figure 10:
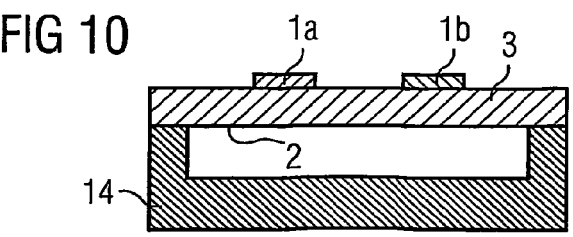
FIG. 10 shows a particularly space-saving arrangement of a ferromagnetic material along a conductor arrangement.

In FIG. 10 a particularly space-saving arrangement analogous to that of FIG. 9 is illustrated.

What is claimed is:

1. Device for signal transmission between a first unit that is movable relative to a second unit along a predetermined path of movement, comprising:
   a transmitter associated with the first unit, for generating differential electrical signals;
   a pair of conductors connected to the transmitter, for carrying the electrical signals along a course of the conductors extending substantially along the path of movement;
   a receiver associated with the second unit for decoupling the electrical signals from the conductors; and
   wherein means for balancing the electrical signals are provided along the course of the conductors.

2. Device according to claim 1, wherein additional means for balancing the electrical signals are provided between the transmitter and the conductors.

3. Device according to claim 1, wherein additional means for balancing the electrical signals are provided between the conductors and the receiver.

4. Device according to claim 1. wherein the conductors are designed to be symmetrical.

5. Device according to claim 1, wherein each of the conductors comprises an electrically conductive reference surface, and furthermore at least one dielectric is provided between each of said conductors and the reference surface.

6. Device according to any claim 1, wherein additional transmitters or the means for balancing electrical signals are disposed in the immediate vicinity of the conductors.

7. Device according to claim 1, wherein the means for balancing electrical signals are incorporated in the conductors.

8. Device according to claim 1, wherein the means for balancing electrical signals, and also the conductors, are incorporated in a multi-layer printed circuit board.

9. Device according to claim 1, wherein passive elements like ferromagnetic components are disposed on the conductors.

10. Device according to claim 1, wherein the conductors are arranged in parallel to one another.

11. Device according to claim 1, wherein a transformer having a balancing action is provided for balancing the electrical signals.

12. Device according to claim 1, wherein the balancing means having two conductors that are disposed to be parallel to each other and are wound to form two coils.

13. Device according to claim 12, wherein at least on of the coils has been formed by planar circuit-board techniques.

14. Device according to claim 12, wherein at least one of the coils has a core of ferromagnetic material.

15. Device according to claim 1, wherein the transmitter having a balanced output stage is provided for emitting the electric signals as balanced signals.

16. Device according to claim 11, wherein the transformer is a balun or Guanella transformer.

17. Device according to claim 1, further comprising at least one more transmitter associated with the first unit.

18. Device according to claim 17, further comprising at least one more conductor connected to the transmitter and/or the at least one more transmitter.

19. Device according to claim 18, further comprising at least one more receiver associated with the second unit.

* * * * *